United States Patent [19]

Simpson

[11] 4,379,109
[45] Apr. 5, 1983

[54] METHOD OF PREPARING A MONOLITHIC STRUCTURE HAVING FLOW CHANNELS

[75] Inventor: Edgar A. Simpson, Severna Park, Md.

[73] Assignee: W. R. Grace & Co., New York, N.Y.

[21] Appl. No.: 874,584

[22] Filed: Feb. 2, 1978

[51] Int. Cl.$^3$ ............................................. C04B 39/12
[52] U.S. Cl. ........................................ 264/60; 264/63
[58] Field of Search .................................. 264/60, 63

[56] References Cited

U.S. PATENT DOCUMENTS

| | | | |
|---|---|---|---|
| 3,854,186 | 12/1974 | Sergeys | 264/58 |
| 3,887,411 | 6/1975 | Goodyear | 264/65 |
| 3,943,994 | 3/1976 | Cleveland | 264/63 |
| 4,046,612 | 9/1977 | Warner | 264/60 |

Primary Examiner—John A. Parrish
Attorney, Agent, or Firm—Mark T. Collins

[57] ABSTRACT

A method of preparing ceramic monolithic structures having flow channels and their use as heat exchangers, filters, and catalyst supports are disclosed. In the method, a substantially uniform mixture of a composition comprising a ceramic powder, a polyolefin binder, and a plasticizer is shaped to form flat sheets and a series of ribs is formed on a first side of at least a portion of the sheets. After extraction of the plasticizer, a ceramic cement composition is applied to the ribs or to the second side of the sheets and the sheets are positioned in a layered structure such that the ceramic cement composition is in adhesive contact with a surface of the adjacent sheet. Firing the layered structure to sinter the ceramic powder and the cement composition and to decompose the polyolefin provides a monolithic structure of desirable strength and controlled porosity.

8 Claims, 2 Drawing Figures

METHOD OF PREPARING A MONOLITHIC STRUCTURE HAVING FLOW CHANNELS

This invention relates to a method of making ceramic monolithic structures having a plurality of flow channels therethrough and the use of such structures as filters and heat exchangers. The materials are also suitable for use as catalyst supports.

Ceramic materials are desirable for use as materials to construct monolithic structures having flow channels therethrough because of their relatively light weight, low cost, and high temperature capability. A major disadvantage of ceramics is the difficulty inherent in forming them due to their low strength in the green unfired state and to their brittleness in the fired state. A variety of manufacturing techniques have been employed in attempts to combine strength in the green state for forming and other processing steps and strength of the final structure. Generally, the structures are prepared by alternately stacking or winding relatively thin flat sheets with corrugated, ribbed, or otherwise profiled sheets and then subjecting this green structure to a high firing temperature to sinter weld and harden the structure. The sheets may be formed by casting a ceramic film from a slurry onto a support sheet. The support sheet may comprise a fugitive material which volatilizes on firing or a material such as aluminum which converts to the oxide on firing and becomes an integral part of the structure. Fugitive support materials may decrease contact of the sheet profiles with the web of the adjacent sheet thereby reducing the formation of sinter welds during firing and the mechanical strength of the finished structure. When the support material remains in the finished structure, the ceramic and support material must have compatible thermal expansion coefficients for the structure to exhibit high thermal shock resistance and avoid cracking and leakage of the structure.

U.S. Pat. No. 3,854,186 to Sergeys describes methods of making the monolithic structures. Sergeys prepares a heat exchanger having cross-flow or countercurrent channels by: (1) shaping a composition comprising a ceramic material, a polyolefin binder, and a plasticizer to form flat sheets; (2) forming sets of ribs on each of the sheets so that the ribs on one-half of the sheets are in one direction and the ribs on the other half of the sheets are at a 90° angle to the ribs on the first sheet; (3) preparing a layered structure by positioning the first sheet on top of the second sheet in a manner such that the ribs on the second sheet contact the web of the first sheet and are in 90° relationship with the ribs on the first sheet; (4) heat sealing the ribs on the first sheet to the web of the second sheet; (5) rolling this layered structure on a mandrel in a manner such that the protruding ribs on the one section of the layer are contacted with the web of the second layer so that these ribs can be heat sealed to the web of the layer immediately above it; (6) cutting sections from this rolled-up structure; and (7) extracting the plasticizer and firing the structure to burn out the polyolefin and sinter the structure.

Heat exchangers are of great importance for fuel economy and emissions reduction, particularly for gas turbine engines in which they are used to preheat incoming air and to recover heat in the exhaust gas. Ceramic monolithic structures having flow channels therethrough are generally used as heat exchangers in two different configurations. In one design, the heat exchanger is a regenerator which is a slowly rotating device heated by hot exhaust gases on one side and giving up this heat during rotation to the incoming cool gases on the other side. In the more commonly used recuperator design, the heat exchanger is stationary and hot and cold gases are passed through alternate layers of cross-flow or countercurrent channels at 90 degree angles to each other.

In gas turbine applications, the heat exchanger must exhibit high thermal shock resistance but it is desirable to minimize the thickness of channel walls to permit greater heat transfer. As a result, the weaker green structure may tend to sag or deform in handling prior to firing which results in undesirable, non-uniform channels through the monolithic structure. If the sheets are individually fired and thereafter stacked and bonded together, effective bonding may be difficult to achieve. Further, when a fugitive support material or binder is employed, the porosity of the final structure must be controlled to avoid internal leakage.

High temperature filters, i.e., filters that will withstand temperatures up to about 14,000 K., are used, for example, in turbine electricity generators run on gas produced directly from coal. The structure of the filter traps the micron and submicron particles remaining in the incoming gas stream after cyclone separation and electrostatic precipitation and filtered gas exits from the filter. Without filtration, these particles can damage and even accumulate on the rotor blades of the turbine.

SUMMARY OF THE INVENTION

According to the method of this invention, a substantially uniform mixture of a composition comprising a ceramic powder, a polyolefin binder, and a plasticizer is shaped to form flat sheets and a series of ribs is formed on a first side of at least a portion of the sheets. After extraction of the plasticizer, a ceramic cement composition is applied to the ribs or to the second side of the sheets and the sheets are positioned in a layered structure such that the ceramic cement composition is in adhesive contact with a surface of the adjacent sheet. The layered structure is fired to sinter the ceramic powder and the cement composition and to decompose the polyolefin. The method provides green structures of flexibility and strength and fired structures having desirable strength and controlled porosity.

The sheets from which the layered structure is made are prepared from a starting material comprising a ceramic powder, a polyolefin binder, and a plasticizer for the binder. The ceramic materials are employed as finely divided, sinterable powders. Generally, any ceramic or glass particles which will sinter or sinter and devitrify to form a ceramic body when heated to conventional firing temperatures are useful in this invention. Solid oxides such as aluminum oxide, rare earth oxides, refractory metal oxides, zirconium oxides and silicon oxides can be used. Preferred materials that exhibit low coefficient of thermal expansion in the fired state include alpha alumina, lithium aluminum silicates, magnesium aluminum silicates, lithium-magnesium aluminum silicates, aluminum silicates, spodumene, magnesium aluminum spinels, mullite, cordierite, magnesium titanate, aluminum titanate and fused silica.

The starting material also contains an organic thermoplastic binder for the ceramic material to confer, in combination with the plasticizer, strength and flexibility to green sheet. The organic binder is generally a polyolefin and preferably a high molecular weight polyolefin, such as high molecular weight polyethylene. A polyolefin of high molecular weight (e.g., at least 150,000) is a good binder for ceramic powder and can tolerate high ceramic loadings without becoming brittle when a plasticizer is present. High molecular weight low density polyethylene, high molecular weight polypropylene, and high molecular weight particle form ethylene-butylene copolymer can also be used to give entirely satisfactory results. Further, depending upon the desired physical properties of the final product, the high molecular weight polyethylene can be blended with standard commercial lower molecular weight polyethylene, to the extent that a too low overall molecular weight of the blend and consequent brittleness of the green sheet are avoided.

Any commercially available polyethylene having a standard load melt index of substantially zero and a density from about 0.93 to about 0.97 is satisfactory. A commercial particle form high molecular weight polyethylene, having a standard load (2,160 g.) melt index of 0.0, a high load (21,600 g.) melt index of 1.8, a density of 0.95, and a viscosity of 4.0 measured as 0.02 grams of polymer in 100 g. Decalin at 130° C. is especially suitable. This polymer can be prepared by the method given in U.S. Pat. No. 2,852,721 using an ammonium fluoride treated chromium oxide catalyst. Melt index and high load melt index measure polyethylene flow under pressure and thus average molecular weight and are measured in accordance with ASTMD-1238-GST condition F and ASTM-D-1238 65 condition E (except that a weight of 211,600 grams is used to measure high-load melt index).

The plasticizer facilitates the dispersion of the ceramic material, decreases the viscosity of the mixture and mixing required, improves the flexibility of the green sheet, and produces porosity and increased strength on extraction. A single plasticizer or combinations of plasticizers may be used. Suitable plasticizers that provide flexibility while retaining suitable strength include chlorinated hydrocarbons, sulfonamide, coumarone-indene, asphalt, hydrocarbon oils such as mineral oil, glycols, glycol ethers and esters, alkyl phosphates, and water-soluble vinyl polymers.

The composition of the starting material can vary greatly according to the desired properties of the green sheet and the porosity and other properties needed in the final product. For example, the components may be employed in the following amounts to provide a suitable green and fired structure: about 15 to about 85 volume percent, preferably about 20 to about 80 volume percent, of the ceramic material; about 5 to about 70 volume percent, preferably about 5 to about 50 volume percent, of the polyolefin binder; and about 10 to about 70 volume percent, preferably about 20 to about 60 volume percent, of the plasticizer.

The three components may be blended together by various techniques to form a substantially uniform mixture thereof. It is possible to produce the composition by mixing the components in any order. For example, the ceramic material and the plasticizer may be slurried in a volatile solvent which is evaporated before the polyolefin is added. Generally, the components are mixed in a plastograph at 30 to 200 revolutions per minute until the composition appears uniform.

It is possible to provide additional pore volume in a porous ceramic structure by foaming the filled polyolefin composition by the addition of any known foaming agent to the filled, plasticized polyolefin composition.

Such a composition can then be fabricated into any foamed shape and developed into a porous ceramic structure by the steps described hereinafter.

The composition may be formed into flat green sheets of the desired thickness by a variety of known methods. For example, the mixtures may be pressed on a hydraulic press into 0.020 inch (nominal thickness) sheets at 125°–175° C. for about 3 minutes at about 500 pounds per square inch pressure. Preferably, the sheets are formed by extrusion through a sheet die. A typical extruder has a 20:1 length to diameter ratio and a 3:1 compression ratio. The sheets are extruded at temperatures of from 300°–500° F. and about 0.25 inches thick with a suitable width being from 3 inches to 40 inches or wider.

The ceramic structures of this invention may be formed by molding, crimping, or the like into corrugated sheets which in cross section represent a repeating pattern. Preferably, a series of ribs that are substantially rectangular in cross section are formed on the sheets by conventional methods such as molding, extrusion embossing, calendering, and the like.

Extrusion and embossing are most conveniently performed together. For example, when a cross-flow structure is desired, there may be used duplicate extrusion and embossing units where one set of sheets is embossed with grooves running in one direction and another set of sheets embossed with grooves at a 90° angle to the grooves in the first sheet.

The plasticizer may then be extracted from the green sheets. The extraction can be accomplished by any solvent in which the plasticizer is soluble. For example, when the plasticizer is a hydrocarbon oil, such as mineral oil, it can be extracted with an organic solvent, such as hexane, heptane and, pentane, or chlorinated solvents such as carbon tetrachloride, trichlorethylene, and perchlorethylene, for example. Other organic solvents such as petroleum ether and diethylether can also be used. When the plasticizer is a water soluble compound, such as diethylene glycol, the plasticizer can be extracted with water. The removal of the plasticizer results in the formation of a microporous structure. In addition to providing greater surface area, the extraction of the plasticizer prior to burning off the polyolefin is of great value since the formation of the micropores aids in removing gaseous products which are formed when the polyolefin is burned off.

A cement composition is applied to the sheets. The components of the cement are selected to provide green strength to the layered structure after drying and preferably to increase the formation of sinter welds on firing. A preferred cement composition comprises one or more ceramic materials such as those used in the sheet since thermal expansion compatibility can be readily achieved. The solvent for the cement composition may be an organic solvent but deionized water is preferably used to form an aqueous cement composition since the extracted sheets will adsorb a considerable quantity of any organic solvent which would be then removed. Generally, the ceramic material will comprise from about 40 to about 60 weight percent of the composition.

Preferably, the cement composition contains a thickening agent and/or a mineralizer. The thickening agent serves to give green strength to the dried layered structure and may be, for example, water-soluble cellulose derivatives such as ethers and esters, polyvinyl alcohols and acetates, styrene-butadiene latex, acrylic copolymers, and the like. Preferred water-soluble cellulose derivatives include methylcellulose, ethylcellulose, and hydroxyethylcellulose and the like. Generally, the thickening agent is employed in an amount to form a paste and preferably comprises from about 0.5 to about 10 weight percent of the cement composition.

The mineralizer is added to the composition in an amount sufficient to produce a slight flow of the ceramic material of the cement composition at the firing temperature and provide a smooth coating and increased bonding in the monolithic structure. Thus, the mineralizers may be added in an amount of generally from about 0.25 to about 5 weight percent and preferably from about 0.5 to about 4 weight percent of the cement composition.

The mineralizer may be, for example, an alkali metal or alkaline earth metal oxide or a precursor thereof which converts to the oxide during firing. Typical mineralizers include potassium oxide, sodium oxide, calcium oxide, lithium oxide, barium oxide, and magnesium oxide.

The components of the cement composition may be milled to provide a paste and applied to the flat web and/or the corrugations of the sheets. The preferred method would be to coat the web of the sheets continuously.

After drying, the sheets or the layered structure may be cut to provide the desired size after shrinkage on firing with any suitable cutting device. It is preferred to cut the green materials rather than after firing since it eliminates breakage problems that may be caused by cutting a ceramic structure.

Sheets of the desired size may be formed into a layered structure by positioning the sheets on top of one another such that the corrugations, such as ribs, of a first sheet contact the web, or flat side, of an adjacent sheet. In a preferred embodiment, the sheets are positioned so that the ribs in adjacent layers of the structure are in 90° relationship to each other to provide cross-flow channels. For example, a sheet coated with the cement composition on its web may be positioned rib side down and the next sheet placed rib side down in contact with the web of the first sheet and alternate layers of this type formed until the desired height is reached. Various arrangements of ribbed sheets and ribbed sheets and flat sheets may be employed.

The layered structure is heated to above the degradation temperature of the thermoplastic so as to completely burn off the polyolefin. The degradation temperature will, of course, vary with the choice of polyolefin. For the preferred high viscosity linear polyethylene, a temperature in the range of at least 240° to 260° C. is greatly preferred to initiate degradation.

At a temperature of about 240° C. (when polyethylene is the polyolefin) the structure begins to turn black and at about 700° C. the structure begins to turn white, indicating that the thermoplastic has entirely burned off. The structure becomes microporous due to the removal of the polyolefin.

When the thermoplastic is completely burnt off, the temperature is increased to that in which the particular ceramic material sinters while still retaining the microporosity. When using alpha alumina, a temperature of about 1,300°–1,450° C. is recommended. The temperature is held at the sintering point for about 2 hours and then the structure is allowed to cool slowly to room temperature for about 3 to about 4 hours.

When the monolithic structure of this invention is used as a heat exchanger, the gases and/or liquids undergoing heat exchange pass through the respective channels that are formed by the corrugations or ribs and that are in heat exchange relationship. The dimensions of the ribs and consequently of the channels depend upon the types of materials being subjected to heat transfer. Generally, smaller channels are employed for gases since liquids demonstrate better heat transfer properties than gases.

The structure is usually used as a filter in the form of a cube having countercurrent flow channels in alternate layers but may have rectangular or other shapes. As an illustration of the operation, one of the four sides of the structure showing channels is cemented and may be backed up to a plate. The unfiltered hot gas enters the channels opposite the cemented side and passes through the porous web of the structure into adjacent layers. Clean filtered gas exit through the channels at 90° from the incoming gas. A number of these filters may be used to obtain a continuous flow of clean gas. As particles are filtered out of the gas stream, pressure begins to build up. At some predetermined rise in pressure, a filter or group of filters may be taken out of the line, flushed to remove the particles that have accumulated on the filter, and then returned to service.

The porosity of the web of structures produced by the method of this invention can be controlled from less than about 10 to greater than about 50 percent and pore size distribution from about 0.1 to about 100 microns. Low porosity may be obtained by increasing the amount of ceramic material and thickness of the sheets, the use of mineralizers to produce some lower temperature glasses, glass frits, and the use of higher firing temperatures to increase the shrinkage and final density. Conversely, lower sheet thickness and ceramic loading and the addition of blowing agents to the composition provide higher porosity.

In order to describe the invention even more clearly,

Figure 1:
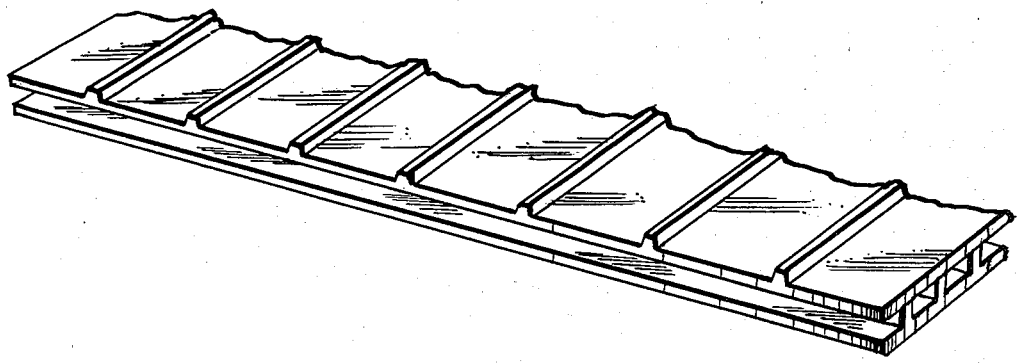
FIG. 1 shows the ribbed and cement coated sheets positioned in 90 degree relationship to form a layered structure.
Figure 2:
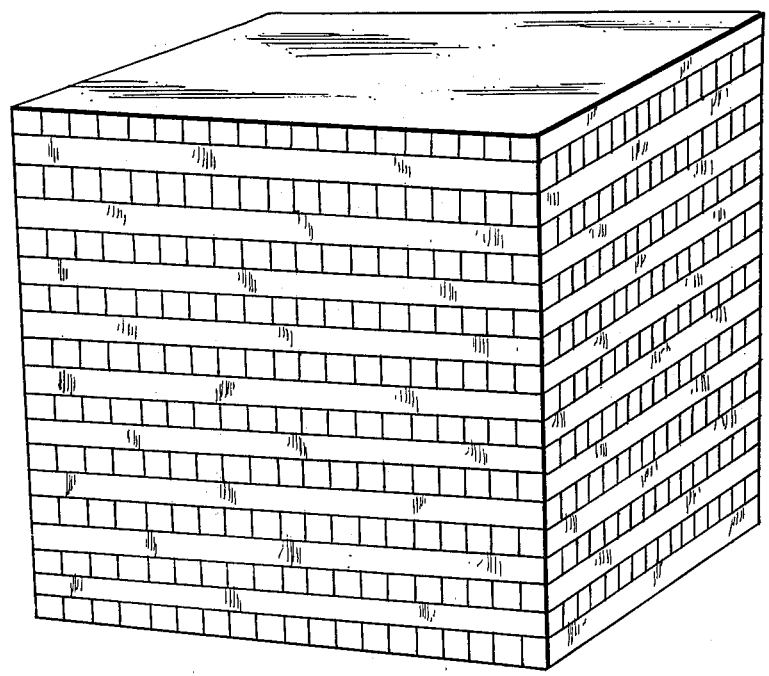
FIG. 2 shows a cross-flow embodiment of the final heat-exchanger or filter.

This invention is illustrated by the following example.

EXAMPLE

The starting composition was prepared by mixing 8.6 grams of particle form polyethylene, 76.8 grams of a mixture containing calcined talc, calcined kaolin, and calcined alumina, and 28.8 grams of a mineral oil containing approximately 80% saturates in a Brabender Plastograph heated to 170° C. The composition was extruded and pressed into sheets 12 mils thick and 8 inches wide in a hydraulic press with 12 tons force. Ribs were then pressed on separate sheets. The ribs were about 20 mils wide and 13 mils high and spaced ⅛ inch apart. 5 inch by 6 inch pieces were cut from the ribbed sheet and the mineral oil extracted by immersion in hexane.

A cement composition was prepared from the components shown in the table and ball milled for 3 hours.

TABLE 19.425% calcined talc
23.000% calcined kaolin
5.895% calcined alumina
2.013% barium carbonate
1.342% methylcellulose
48.321% deionized water Barium carbonate is a preferred mineralizer.

The cement was brushed on the flat side of the sheets. A first sheet was placed rib side down and the next sheet turned 90° and placed rib side down in contact with the web of the first sheet to provide a layered structure with a fired height of 8.5 inches. The green structure was then dried overnight at 175°–225° F. to remove water and fired to a final temperature of 2360° F.

The structure was successfully used as a filter in removing particles from a gas stream.

What is claimed is:

1. A method of preparing a ceramic monolithic structure having a plurality of flow channels comprising
   (a) shaping a substantially uniform mixture of a composition comprising a ceramic powder, an organic thermoplastic binder, and a plasticizer to form flat sheets;
   (b) forming a series of ribs on a first side of at least a portion of the sheets;
   (c) extracting the plasticizer from the sheets to form sheets comprising the ceramic powder and the organic thermoplastic binder;
   (d) applying a ceramic cement composition to the ribs or to the second side of the extracted sheets;
   (e) positioning the sheets in a layered structure such that the ceramic cement composition is in adhesive contact with a surface of the adjacent sheet; and
   (f) firing the layered structure to sinter the ceramic powder and the cement composition and to decompose the binder.

2. The method of claim 1 in which the sheets are positioned in the layered structure such that the ribs in adjacent layers are in 90 degree relationship with each other.

3. The method of claim 1 in which the mixture of step (a) and the ceramic cement composition of step (d) contain the same ceramic material.

4. The method of claim 1 in which the ceramic cement composition comprises a ceramic material, a thickening agent, and a mineralizer.

5. The method of claim 4 in which the thickening agent is a water-soluble cellulose derivative.

6. The method of claim 4 in which the mineralizer is an alkali metal oxide, an alkaline earth metal oxide, or a precursor thereof that decomposes to the oxide when the structure is fired.

7. The method of claim 6 in which the mineralizer is barium carbonate.

8. The method of claim 1 in which the organic thermoplastic binder is a polyolefin binder.

* * * * *